United States Patent [19]
Dal Santo et al.

[11] 3,968,516
[45] July 6, 1976

[54] AUTOMATIC GAIN CONTROL CIRCUIT

[75] Inventors: Paul A. Dal Santo, Woodridge; Charles J. Marik, Chicago, both of Ill.

[73] Assignee: Quasar Electronics Corporation, Franklin Park, Ill.

[22] Filed: June 3, 1974

[21] Appl. No.: 475,565

[52] U.S. Cl. .................. 358/27; 325/409; 330/29
[51] Int. Cl.² .......................... H04N 9/535
[58] Field of Search ............ 358/27, 40; 325/409, 325/408, 414, 62, 477, 478; 329/147, 146, 204, 206; 178/7.3 R; 330/29

[56] References Cited
UNITED STATES PATENTS

| | | |
|---|---|---|
| 2,802,939 | 8/1957 | Klehfoth ..................... 325/477 X |
| 3,141,064 | 7/1964 | Macovski ..................... 358/27 |
| 3,624,296 | 11/1971 | Slavik et al. ................. 358/27 X |
| 3,708,613 | 1/1973 | Nakabe et al. ............... 358/27 X |
| 3,735,037 | 5/1973 | Baker et al. ................. 329/147 X |
| 3,763,491 | 10/1973 | Ishman ....................... 325/408 X |

*Primary Examiner*—Robert L. Griffin
*Assistant Examiner*—Mitchell Saffian
*Attorney, Agent, or Firm*—LaValle D. Ptak

[57] ABSTRACT

An automatic chrominance gain control circuit for a color television receiver distinguishes between lower frequency chrominance variations (large color objects) and higher frequency chrominance variations (small objects) to minimize gain control for large color objects and to emphasize gain control for highly saturated contrasting colors in small objects across the picture field.

12 Claims, 1 Drawing Figure

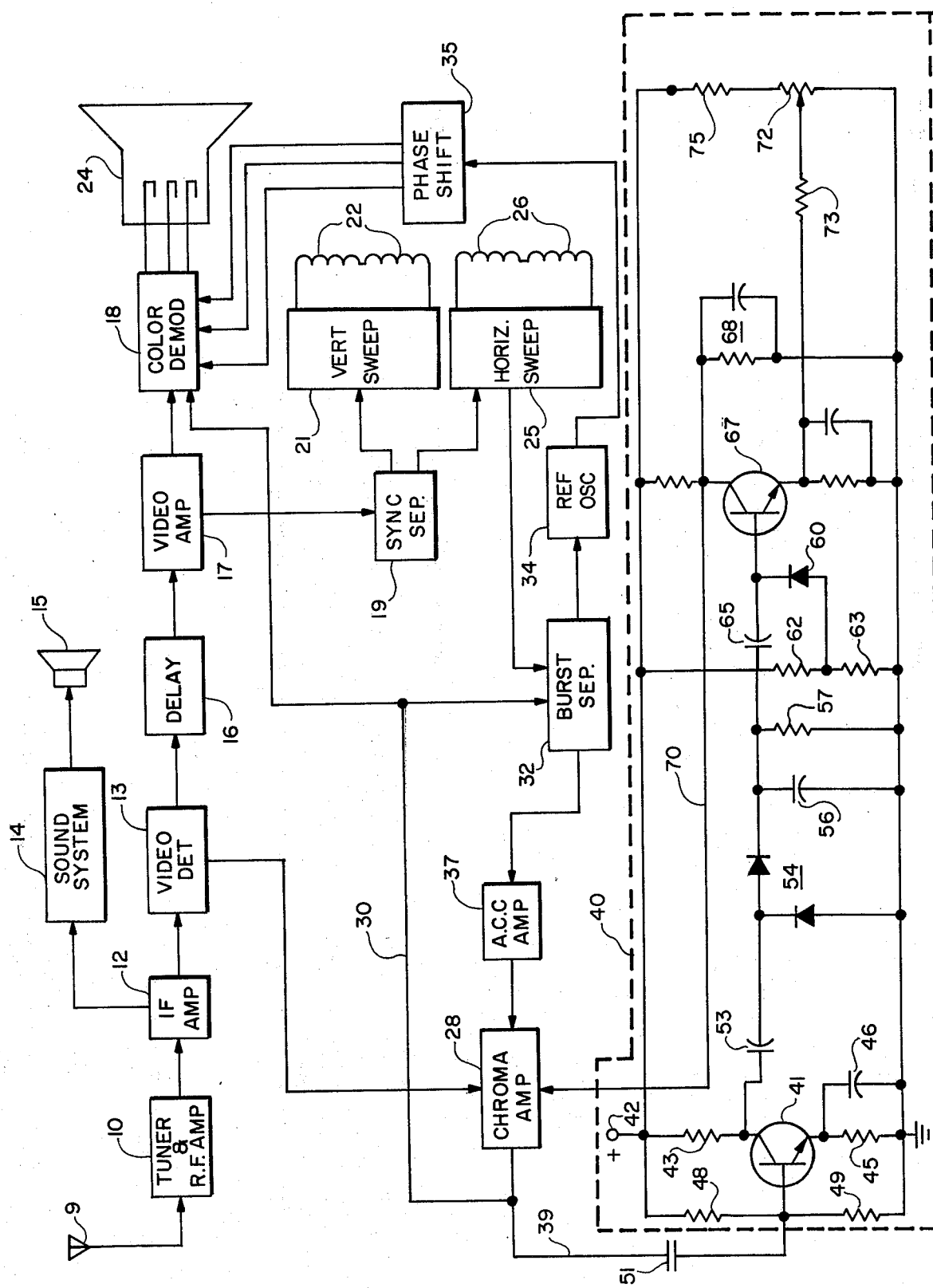

AUTOMATIC GAIN CONTROL CIRCUIT

BACKGROUND OF THE INVENTION

The NTSC color television system presently employed in the United States utilizes a composite television signal including luminance and chrominance (color) signal components. The luminance components include contrast and brightness information, and the chrominance components are transmitted on a suppressed subcarrier wave which is phase modulated to represent hue and amplitude modulated to represent saturation of the color subcarrier in accordance with the ratio of the amplitude of the color subcarrier wave and the brightness information of the luminance component.

In addition to the luminance and chrominance components of the composite signal, there are included horizontal and vertical synchronizing components and a color synchronizing burst component transmitted at the end of each line of video information. The color synchronizing burst component transmitted at the end of each line of video information. The color synchronizing burst component includes a number of cycles of signal at the frequency of the subcarrier wave and is selected to have a standard phase relationship with respect to the phase of the modulated subcarrier wave. Thus, by phase and frequency synchronizing a reference oscillator in a television receiver to the burst component accurate reproduction of hue of the transmitted color theoretically should be effected.

The brightness and chrominance signal components are processed in different portions of the television receiver, and most color television receivers use a separate gain control circuit for the chrominance amplifier. Generally, the system for controlling the gain of the chrominance amplifier is an automatic chrominance control or ACC system which is responsive to the amplitude of the received color burst components of the composite signal. The color synchronizing burst component theoretically has an amplitude bearing a predetermined relationship to the amplitude of the modulated subcarrier, so that an automatic gain control system responsive to the burst amplitude theoretically may be used to cause the reproduction of the proper saturation of the transmitted color components by the receiver.

In actual practice, however, the burst component does not always have the theoretical correct phase and amplitude relationships to the transmitted color signals. As a consequence, in television receivers relying solely upon the burst component to establish the gain of the chrominance amplifier in an ACC loop, reproduction of a color image of improper saturation often results.

Other attempts have been made to cause the gain control of the chrominance amplifier to be effected by a peak detecting circuit responsive to the chrominance signal instead of or in addition to the burst responsive gain control circuit. This type of system theoretically is superior to an ACC system responsive solely to the burst components of the composite signal, particularly when this control is interrelated with the settings of contrast and brightness in the luminance channels. A problem with controlling the gain of the chrominance amplifier in response to a peak detection of the chrominance signal components is that for pictures which have a large background of heavily saturated colors, a peak detection system of this type applies substantial gain reduction to the chrominance amplifier undesirably desaturating the entire picture. Pictures of this type occur frequently enough that it is desirable to have an automatic chrominance control which responds to variations in the chrominance amplitude, but which ignores large areas of heavily saturated colors in the picture field.

SUMMARY OF THE INVENTION

Accordingly, it is an object of this invention to provide an improved automatic gain control circuit.

It is another object of this invention to provide an improved gain control circuit for the chrominance amplifier of a color television receiver.

It is a further object of this invention to produce an automatic gain control voltage responsive to only a portion of an input signal.

It is an additional object of this invention to provide an automatic gain control circuit for use with the chrominance amplifier of a color television receiver which responds primarily to higher frequency amplitude variations of the chrominance signal while being less responsive to lower frequency variations of the amplitude of the chrominance signal.

In accordance with a preferred embodiment of this invention, an automatic gain control circuit for a signal amplifier includes an input stage for receiving an amplitude modulated carrier signal. The output of the input stage is passed through a filter network which partially filters out the carrier signal and which operates in conjunction with a rectifier capacitively coupled to the filter network to detect signals modulated on the carrier signal having frequencies above some upper frequency. This latter frequency is determined by the characteristics of the capacitive coupling which blocks signals below such frequency. Thus, the gain control voltage derived from the circuit is determined primarily by the higher frequency components of the modulated carrier input signal.

BRIEF DESCRIPTION OF THE DRAWING

The sole FIGURE of the drawing is a schematic diagram, partically in block form, of a preferred embodiment of the invention.

DETAILED DESCRIPTION

Referring now to the FIGURE which shows a color television receiver including an automatic chrominance control (ACC) amplifier circuit illustrated in detail.

The color television receiver includes an antenna 9 supplying input signals to a tuner and RF amplifier stage 10 which receives and converts the incoming television signals to an intermediate frequency signal. The tuner may include, for example, RF stages of the receiver as well as the first detector or mixer and associated local oscillator. The output intermediate frequency signal developed by the tuner 10 is coupled through an intermediate frequency (IF) amplifier stage 12 to a video detector 13. The output of the intermediate frequency amplifier 12 also is supplied to a sound system 14, which supplies amplified audio signals to a loudspeaker 15. The brightness and synchronizing components in the detected composite video signal are delayed in a delay circuit 16, for purposes well known to those skilled in the art, and are applied to a video amplifier 17, the output of which is supplied to a color demodulator circuit 18 illustrated as a direct color demodulator.

The composite signal provided by the video amplifier 17 includes video information components with a blanking interval recurring at the horizontal rate of 15,734 hertz. A horizontal synchronizing pulse appears at the beginning of each blanking interval immediately followed by a burst signal component. A vertical synchronizing pulse also appears in the composite video signal at a 60 hertz rate and is separated from the remainder of the composite signal in a synchronizing pulse separator circuit 19. The separated vertical synchronizing pulses then are applied to a vertical sweep system 21 which develops a vertical sawtooth sweep signal in vertical deflection windings 22 placed on the neck of a color cathode ray tube 24 for vertically deflecting the electron beams therein.

The horizontal synchronizing pulse also is separated from the remainder of the composite signal in the pulse separator circuit 19 and is supplied to a horizontal sweep system 25, which develops the horizontal sweep signals in horizontal deflection windings 26 placed on the neck of the cathode ray tube 24 for horizontally deflecting the electron beam in the cathode ray tube.

The composite signal obtained from the video detector 13 also is supplied to a chroma amplifier stage 28 which includes a color bandpass filter having bandpass characteristics for selectively passing only the chrominance signal components of the detected composite signal. These chrominance components comprise the color subcarrier, its sidebands, and the burst signal component. These components then are amplified by amplifier portions of the chroma amplifier circuit 28, the output of which in turn is supplied to the color demodulator 18 over a lead 30. The lead 30 also supplies the amplified chrominance signal to a burst separator circuit 32 which may be suitable gate circuit controlled by gating pulses obtained from the horizontal sweep system 25. The gating pulses cause the burst separator gate 32 to pass signals only during the recurring time intervals occupied by the color synchronizing burst components.

These burst components then are obtained from the burst separator circuit 32 and are used to phase-lock or synchronize a color reference oscillator 34. The output of the oscillator 34 is supplied to a phase-shift circuit 35 to produce the three phases of color reference signal to the color demodulator circuit 18 for demodulating the red, blue and green color signal components. These demodulated components then are applied to the cathodes of the three electron guns of the three beam cathode ray tube 24. As stated previously, the synchronous color demodulator 18 is shown, for purposes of illustration only, as directly producing the three color signals needed to drive the cathodes of the cathode ray tube 24.

The output of the burst separator circuit 32 also is supplied to an automatic chroma control (ACC) amplifier circuit 37 which develops a direct current (DC) control voltage proportional to the amplitude of the burst signal components obtained from the burst separator curcuit 32. This DC control voltage then is utilized to control the gain of the chrominance amplifier 28 in a normal manner.

In accordance with the preferred embodiment of the invention shown in the drawing, the output of the chroma amplifier 28 also is applied over a lead 39 to the input of an automatic chrominance control circuit 40 which is shown enclosed within the dotted lines.

The control circuit 40 includes a first NPN amplifier transistor 41, the collector of which is supplied with B operating potential from a source of positive supply voltage (not shown) on a voltage supply terminal 42 through a collector load resistor 43. The emitter of the transistor 41 is coupled through a parallel resistor 45 and capacitor 46 to a second grounded supply terminal, and the base of the transistor 41 is supplied with a DC bias potential from a voltage divider comprising a pair of resistor 48 and 49 connected between the terminal 42 and ground.

Input signals for the transistor 41 are applied over the lead 39 to the base of the transistor through a coupling capacitor 51 and comprise the amplitude modulated chroma subcarrier components of the composite color television signal. The input signals appear in amplified form on the collector of the transistor 41. These amplified chrominance signals are coupled through a DC blocking capacitor 53 to a voltage doubler detector circuit 54 which in conjunction with a capacitor 56 and resistor 57 is used to partially detect the modulated signal and to boost the value of the voltage upon which the circuit operates. The partial detection is accomplished by selecting the value of the capacitor 56 to be less than that required for complete detection. The blocking capacitor 53 is for the purpose of preventing the control circuit from falsely operating on the DC level applied to the system.

The output of the voltage doubler detector 54 is filtered by a parallel resistor capacitor network (RC network) comprising the capacitor 56 and the resistor 57 which operates as a partial 3.58 MHz filter (the frequency of the chrominance subcarrier). The time constants of the filter are selected to pass 25 to 50 percent of the 3.58 MHz signal superimposed on the detected envelope. A diode 60 then operates with a transistor 67 to detect the signal passed by the filter 56, 57. A quiescent operating level for the circuit is established by coupling the anode of the diode 60 to a voltage divider consisting of a pair of resistors 62 and 63 connected between the positive voltage supply terminal 42 and ground.

The RC filter network comprising the capacitor 56 and resistor 57 is separated from the diode 60 by a capacitor 65 which functions to block low frequency signal variations, but which passes signal variations with frequencies above approximately 100 kilohertz. Those frequencies are detected by the diode 60 and the emitter-base diode of the NPN output transistor 67 which supplies a DC chroma control output established by an RC filter 68 over a lead 70 to the chroma amplifier 28. This is a direct current automatic gain control voltage for controlling the gain of the chroma amplifier supplementary to the control provided by the ACC amplifier 37.

Since the capacitor 65 blocks signals below 100 kilohertz, the system is less responsive to highly saturated large color objects than small objects since such large objects appear as low frequency (under 100 kilohertz) amplitude variations and are prevented from reaching the rectifier diode 60 by the capacitor 65. Because the filter 56, 57, however, passes some of the 3.58 MHz signal components, there is still some reduced response, and thus some gain control even for these large color objects. Chrominance variations of higher frequencies, however, are all passed by the capacitor 65 for detection by the diode 60 and transistor 67. The circuit operates as a peak chroma detector for the full amounts of these higher frequency chrominance signal components. Thus, for higher frequency chrominance components, the system operates to provide maximum gain reduction of the chroma amplifier, which is the desired condition and helps to keep chrominance noise at a reduced level.

The threshold setting of the amplifier 67 and, consequently, the level of control effected by the chrominance gain control circuit 40, may be adjusted by a potentiometer 72 coupled between ground and the B+ supply terminal 42. The tap of the potentiometer 72 is connected to the emitter of the transistor 67 through a coupling resistor 73 to change the effective impedance in the emitter circuit of the transistor. The range of control effected by the movement of the tap on the potentiometer 72 is limited by an additional resistor 75 connected in series with the potentiometer 72 across the voltage supply.

We claim:

1. A selective frequency automatic gain control circuit for a signal amplifier including in combination:
   input circuit means for receiving an amplitude modulated carrier signal having a first predetermined frequency,
   a detector-filter network coupled with the output of said input circuit means and having circuit parameters selected to partially detect said carrier signal to produce an output signal comprising the modulation waveform and a portion of the carrier signal;
   second detector circuit means including high-pass filter means coupled with the output of said detector-filter network for detecting signals having frequencies above a second predetermined frequency, which is within the frequency range of the information portion of the modulated waveform and which is below said first predetermined frequency, and including means for blocking the detection of signals having a frequency below said second predetermined frequency; and means coupling said second detector circuit with said signal amplifier for supplying gain control signals thereto.

2. The combination according to claim 1 wherein said means for blocking signals included in said second detector circuit means comprises capacitive coupling means as at least a part of said high-pass filter means and said second detector circuit means includes a detector portion coupled through said capacitive coupling means to said detector-filter network, the value of capacitance of said capacitive coupling means being sufficient to block signals having a frequency below said second predetermined frequency and to pass signals above said second predetermined frequency so that said detector portion detects signals having frequencies above said second predetermined frequency.

3. The combination according to claim 2 wherein said second predetermined frequency is substantially below the frequency of said carrier signal and further including a direct current blocking capacitor coupled in curcuit between the output of said input circuit means and said detector-filter network.

4. The combination according to claim 2 wherein said second detector circuit means includes a diode having an anode and a cathode, with one of the anode and cathode thereof coupled through said capacitive coupling means with said filter-detector network and the other of said anode and cathode coupled with a predetermined direct current potential.

5. The combination according to claim 4 further including output amplifier means having an input and an output, with the input thereof coupled with a junction between said capacitive coupling means and said diode and the output thereof coupled with said signal amplifier for supplying a gain control voltage thereto.

6. The combination according to claim 4 wherein said amplitude modulated carrier signal comprises a color television chrominance signal and said predetermined second frequency is 100 kilohertz.

7. The combination according to claim 1 wherein said filter-detector network includes a filter portion comprising a resistor and a capacitor connected in parallel with one another between a point of reference potential and a rectifier portion coupled with the output of said input circuit means.

8. An automatic gain control circuit for a signal amplifier including in combination:
   first and second direct current voltage supply terminals;
   an input amplifier connected between said first and second voltage supply terminals and having an input control terminal for receiving an amplitude modulated carrier signal thereon;
   a first direct current blocking capacitor having a first end coupled with the output of said input amplifier and having a second end;
   an RC filter network comprising a second capacitor and a resistor coupled in parallel between the second end of said first capacitor and said second voltage supply terminal for filtering said carrier signal;
   a third capacitor having a first end coupled with the second end of said first capacitor and having a second end; said third capacitor having a value selected to block signals having frequencies below a predetermined frequency and to pass signals above said predetermined frequency;
   voltage divider means connected between said first and second supply terminals and having an intermediate tap thereon;
   a diode connected between the second end of said third capacitor and the intermediate tap of said voltage divider;
   an output amplifier coupled between said first and second voltage supply terminals, said output amplifier having an input control terminal coupled with the second end of said third capacitor and having an output terminal coupled with said signal amplifier for controlling the gain thereof; and
   said RC filter network operating in conjunction with said diode to detect those portions of said amplitude modulated carrier signal above said predetermined frequency.

9. The combination according to claim 8 wherein said predetermined frequency is substantially lower than the frequency of said carrier signal.

10. The combination according to claim 9 wherein said amplitude modulated carrier signal comprises a color television chrominance signal.

11. The combination according to claim 10 wherein said signal amplifier is a gain controlled chrominance amplifier for a color television receiver coupled to supply said chrominance signal to the control terminal of said input amplifier and wherein the output terminal of said output amplifier is coupled with said chrominance amplifier to supply gain control signals thereto.

12. The combination according to claim 10 wherein said input amplifier comprises a transistor, the emitter of which is coupled with said second voltage supply terminal, the collector of which is coupled with said first voltage supply terminal and with the first end of said first capacitor, and the base of which comprises said input control terminal; and said output amplifier comprises a second transistor, the collector of which is coupled with said first voltage supply terminal and comprises the output terminal thereof for providing the output signal from said automatic gain control circuit, the emitter of which is coupled with said second voltage supply terminal, and the base of which comprises the input control terminal thereof coupled with the second end of said coupling capacitor.

* * * * *